United States Patent
Hayakawa

[11] Patent Number: 6,122,022
[45] Date of Patent: Sep. 19, 2000

[54] PLASMA ADDRESSING ELECTRO-OPTICAL DEVICE

[75] Inventor: Takuji Hayakawa, Kanawaga, Japan

[73] Assignee: Sony Corporation, Tokyo, Japan

[21] Appl. No.: 09/289,544

[22] Filed: Apr. 12, 1999

[30] Foreign Application Priority Data

Apr. 15, 1998 [JP] Japan ................................. 10-104990

[51] Int. Cl.[7] .............................. G02F 1/133; G09G 3/28; H01J 17/49
[52] U.S. Cl. .................................. 349/32; 345/60; 313/582
[58] Field of Search ................................ 349/32; 345/37, 345/41, 60; 359/342; 313/582

[56] References Cited

U.S. PATENT DOCUMENTS

| 5,596,431 | 1/1997 | Bongaerts et al. ........................ 349/32 |
| 5,800,232 | 9/1998 | Miyazaki ................................. 445/24 |
| 5,909,260 | 6/1999 | Ilcisin et al. .............................. 349/32 |
| 5,909,261 | 6/1999 | Seki et al. ................................ 349/32 |
| 6,002,456 | 12/1999 | Togawa ..................................... 349/32 |
| 6,052,160 | 4/2000 | Bohmer et al. ........................... 349/32 |

*Primary Examiner*—William L. Sikes
*Assistant Examiner*—Tarifur R. Chowdhury
*Attorney, Agent, or Firm*—Hill & Simpson

[57] ABSTRACT

A plasma address liquid crystal display device is arranged such that an ineffective transparent electrode formed in an ineffective picture screen area of its liquid crystal cell is grounded or is applied with a drive voltage substantially same as that applied to a liquid crystal electrode formed in an effective picture screen area adjacent to the ineffective transparent electrode, whereby it is possible to avoid the generation of unstable electric field between the ineffective transparent electrode and the liquid crystal electrode.

2 Claims, 4 Drawing Sheets

PLASMA ADDRESSING ELECTRO-OPTICAL DEVICE

RELATED APPLICATION DATA

The present application claims priority to Japanese Application No. P104990 filed Apr. 15, 1998 which application is incorporated herein by reference to the extent permitted by law.

BACKGROUND OF THE INVENTION

1. Field of the Invention

The present invention relates to a plasma address liquid crystal display device provided with a plasma cell and a liquid crystal cell.

2. Description of the Related Art

FIG. 1 is a front view showing a plasma address liquid crystal display device and FIG. 2 is its cross-sectional view. As shown in FIGS. 1 and 2, the plasma address liquid crystal display device comprises a transparent first substrate 1 and a transparent second substrate 2 each of which is made of, for example, a glass substrate and which are opposed to each other. Between the first and second substrates 1 and 2, there are provided a liquid crystal cell 3 and a plasma cell 4 in a superimposed fashion.

The plasma cell 4 is formed in such a manner that a transparent third substrate 5 made of, for example, a thin glass plate is sealed to the inner surface of the second substrate 2 with a predetermined interval therebetween in an air-tight by a frit 6 to define a narrow flat air-tight space between the second substrate 2 and the third substrate 5.

In the space there are formed in parallel a plurality of partition walls 7 each of which has a stripe-like shape and is extended in one direction, for example, horizontal direction. In the space between the adjacent partition walls 7 and on the inner surface of the second substrate 2, formed in parallel are a first electrode 8 and a second electrode 9 each of which has a stripe-like shape and which form a pair of discharge electrodes. A discharge gas is sealed in the space of the plasma cell 4.

FIG. 3 is a cross-sectional view showing the main portion of the liquid crystal cell 3 in an enlarged scale. As shown in FIG. 3, in the liquid crystal cell 3, there are sequentially arranged color filters R, G and B of red, green and blue in parallel each of which has a stripe-like shape and extended in a direction to cross the extending direction of the first and second electrodes 8 and 9 in the plasma cell 4 described in connection with FIG. 2, for example, in the vertical direction. A black stripe BL is formed between adjacent ones of the respective color filters R, G and B. A stripe-like shape transparent electrode 10 is formed along each of the color filters R, G and B in the extending direction of the black stripe BL.

The first substrate 1 having formed thereon the respective color filters R, G and B and the transparent electrode 10 is bonded to the third substrate 5 at its outer peripheral portion with a predetermined interval therebetween by an adhesive agent 11 in a liquid-tight, and further bonded to the second substrate 2 outside the first-mentioned bonding portion by an adhesive agent 11. A liquid crystal is charged into the flat liquid-tight space between the first substrate 1 and the third substrate 5, whereby the liquid crystal cell 3 is formed.

Every other transparent electrode 10 of the liquid crystal cell 3, for example is extended at its both ends to form a terminal T on both projected sides of the first substrate 1 beyond the second substrate 2 in the vertical direction as shown in FIG. 1. The terminals T are set as column terminal groups 12 to which a drive voltage in the horizontal direction is applied.

One electrode, serving as an anode electrode of the electrodes of the plasma cell 4 is extended at its one end to one side of the second substrate 2 beyond the first substrate 1 in the horizontal direction and is set as row terminal groups 13 to which a drive pulse in the vertical direction is applied.

The respective terminals of the column terminal groups 12 are connected to the corresponding terminals of a column substrate 14, on which a column drive circuit is formed, through flexible cables 15, respectively.

Similarly, the respective terminals of the row terminal groups 13 are connected to the corresponding terminals of a row substrate 16, on which a row drive circuit is formed, through flexible cables 17, respectively.

On the outer surfaces of the first and second substrates 1 and 2 there are respectively provided film-like polarizing plates 18 and 19 whose polarizing axes cross at right angle with each other.

In the plasma cell 4 thus arranged, a plasma discharge is sequentially generated in the plasma spaces defined between the adjacent partition walls 7 to make the third substrate 5 serve as an anode electrode. On the other hand, when a predetermined voltage in accordance with a display signal is sequentially applied to the transparent electrodes 10 in the liquid crystal cell 3, a potential difference is generated at that position across the liquid crystal and hence at that position a potential is written in the liquid crystal. Therefore, if such a state is assumed that no potential difference is applied between both the surfaces of the liquid crystal, for example, and almost all the light from a light source disposed on the rear side of the second substrate 2 can not pass through both the polarizing plates 18 and 19, by the writing of the potential to the liquid crystal mentioned above, the linear polarized light from the polarizing plate 19 is made to pass through the polarizing plate 18, whereby a target optical image can be displayed.

By the way, in the above-mentioned display device, for example, on both outsides of the picture screen in the horizontal direction, there are caused a distortion in the picture screen and an unstable display due to a continuous use in a long period of time and so on.

It was ascertained that the above-mentioned distortion and unstableness of the picture screen were caused by the transparent electrode formed in an ineffective picture screen area outside the effective picture screen area of the display device mentioned above.

In the liquid crystal cell of the display device, in order to prevent any display irregularity from being generated, it is necessary that the thickness of liquid crystal at each display position in the liquid crystal cell should be uniform. In other words, the distance or interval between each of the transparent electrodes 10 and the third substrate 5 has to be set uniform. The interval is set in such a manner that after the respective color filters R, G, B and the transparent electrodes 10 are formed as shown in FIG. 3, particle-like spacers 20 each having a predetermined diameter are dispersed to set the above interval to be a predetermined one. In order to set the interval accurately, it is also necessary that a portion having a height equal to that of the transparent electrode 10 must be formed on the peripheral portion of the liquid crystal cell 3. To this end, in this kind of liquid crystal display device, the transparent electrode 10 is formed not only in the effective picture screen area but also in the ineffective picture screen area around the former at the same time when the light absorbing layer BL disposed between the adjacent color filters R, G and B is formed, and also a dummy light absorbing layer BLD made of the same material and the same thickness as those of the light absorbing layer BL is also formed. On the dummy light absorbing layer BLD, at the same time when the transparent electrode 10 is formed, an ineffective transparent electrode 10D is formed of the same material as that of the transparent electrode 10 and which has the same thickness as that of the transparent electrode 10.

The ineffective transparent electrode 10D is provided so to set the interval only so that any external potential is not applied thereto and it is floated in electrical point of view.

On the contrary, if an electric field is fixedly applied to the liquid crystal in one direction for a long period of time, the composition of liquid crystal is decomposed or the like to thereby cause deterioration of picture quality and life span. As schematically shown by arrows a in FIG. 6, inverse voltages are applied to the transparent electrode 10 so that the liquid crystal driving is inverted.

Since the ineffective transparent electrode 10D is not electrically connected to the outside at all and hence electrically floated, as shown in FIG. 6, between the ineffective transparent electrode 10D and the adjacent transparent electrode 10 which is located on the most outside of the effective picture screen there is generated an electric field b different from the inherent electric field a. Further, the ineffective transparent electrode 10D is apt to be set to a state in which an unstable potential is applied thereto by the electrification in the first substrate 1 or the like. Therefore, it is clarified that an unstable display is carried out near the side edge of the effective picture screen.

SUMMARY OF THE INVENTION

It is an object of the present invention to provided a plasma address liquid crystal display device based on the above clarification.

A plasma address liquid crystal display device according to the present invention is comprised of a liquid crystal cell and a plasma cell which are superimposed each other. Then, an ineffective transparent electrode formed in an ineffective picture screen area of the liquid crystal cell is grounded or is applied with a drive voltage substantially same as that applied to a liquid crystal electrode formed in an effective picture screen area adjacent to the ineffective transparent electrode. Thus, it becomes possible to avoid the generation of unstable electric field between the ineffective transparent electrode formed in the ineffective picture screen area and the liquid crystal electrode formed in the effective picture screen area adjacent to the ineffective transparent electrode.

DESCRIPTION OF THE PREFERRED EMBODIMENT

Figure 1:
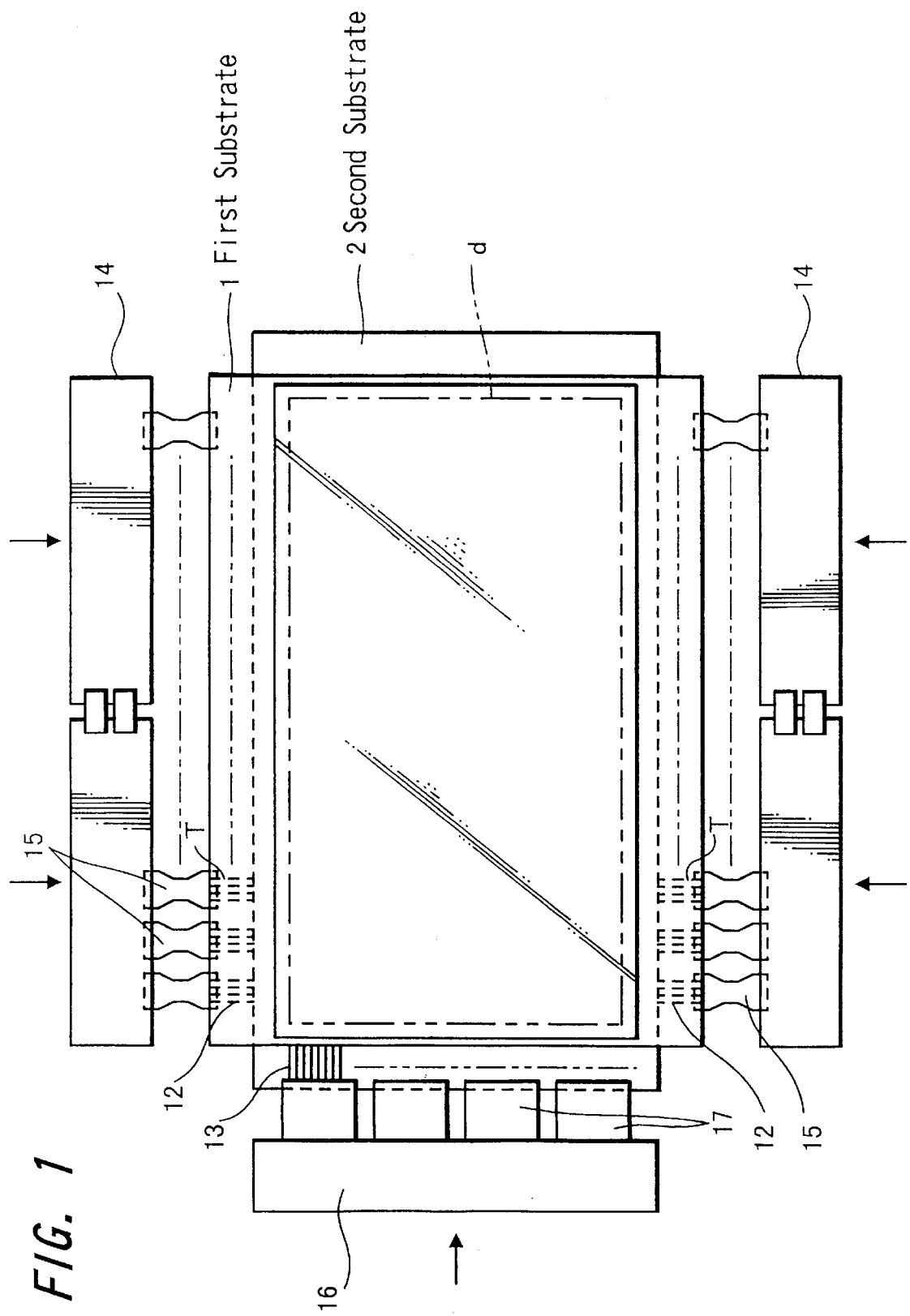
FIG. 1 is a front view showing a plasma address liquid crystal display device to which the present invention is applied.
Figure 2:
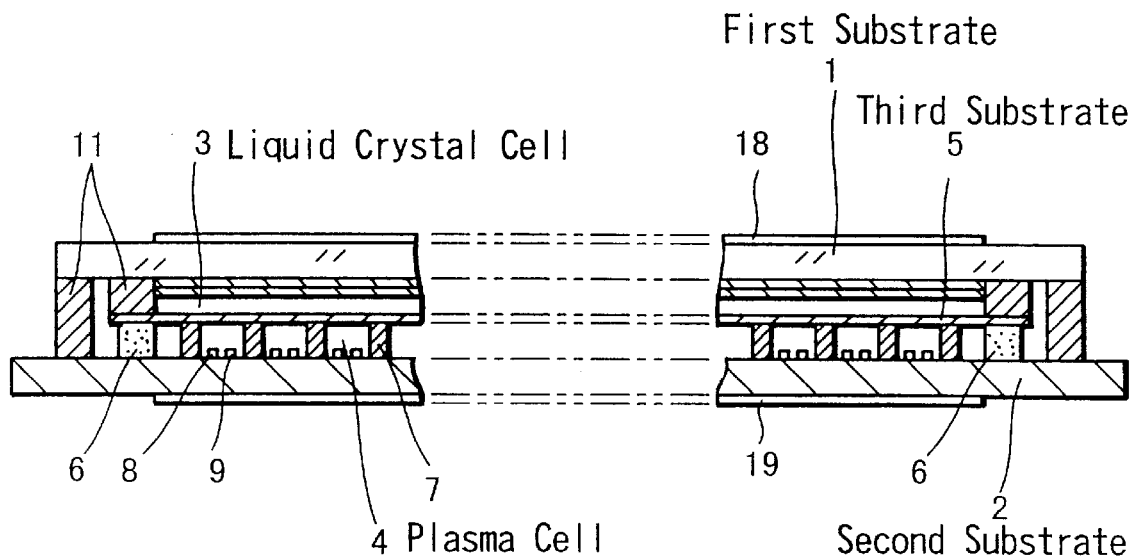
FIG. 2 is a cross-sectional view showing the plasma address liquid crystal display device shown in FIG. 1.

According to a plasma address liquid crystal display device of the present invention, an ineffective transparent electrode formed in an ineffective picture screen area of its liquid crystal cell is grounded or applied with a drive voltage approximately same as that applied to a transparent electrode as a liquid crystal electrode formed in an effective picture screen area adjacent to the ineffective transparent electrode.

A dummy conductive layer is formed on a flexible cable, which is to electrically connect the liquid crystal electrode formed in the effective picture screen area of the liquid crystal cell to the outside, and the terminal portion of the ineffective transparent electrode formed in the ineffective picture screen area is connected to the dummy conductive layer. Then, the ineffective transparent electrode is ground or applied with the above-mentioned drive voltage through the dummy conductive layer.

An example of the present invention will be described with reference to FIG. 1 to FIG. 5. However, the present invention is not limited to this example.

In the plasma address liquid crystal display device of this example, similar to that described above, there are provided first and second transparent substrates which are each mode of, for example, a glass substrate and oppose each other, and a liquid crystal cell 3 and a plasma cell 4 are superimposed between the first and second substrates 1 and 2.

The plasma cell 4 is formed in such a manner that a transparent third substrate 5 made of, for example, a thin glass plate is sealed to the inner surface of the second substrate 2 with a predetermined interval therebetween in an air-tight by a frit 6 to define a narrow flat air-tight space between the second substrate 2 and the third substrate 5.

In the space there are formed in parallel a plurality of partition walls 7 each of which has a stripe-like shape and is extended in one direction, for example, horizontal direction. In the space between the adjacent partition walls 7 and on the inner surface of the second substrate 2, formed in parallel are a first electrode 8 and a second electrode 9 each of which has a stripe-like shape and which form a pair of discharge electrodes. A discharge gas, for example, He, Ne, Ar, Xe, Kr or mixed gas more than two of them is sealed in the space of the plasma cell 4 in an air-tight fashion.

Figure 3:
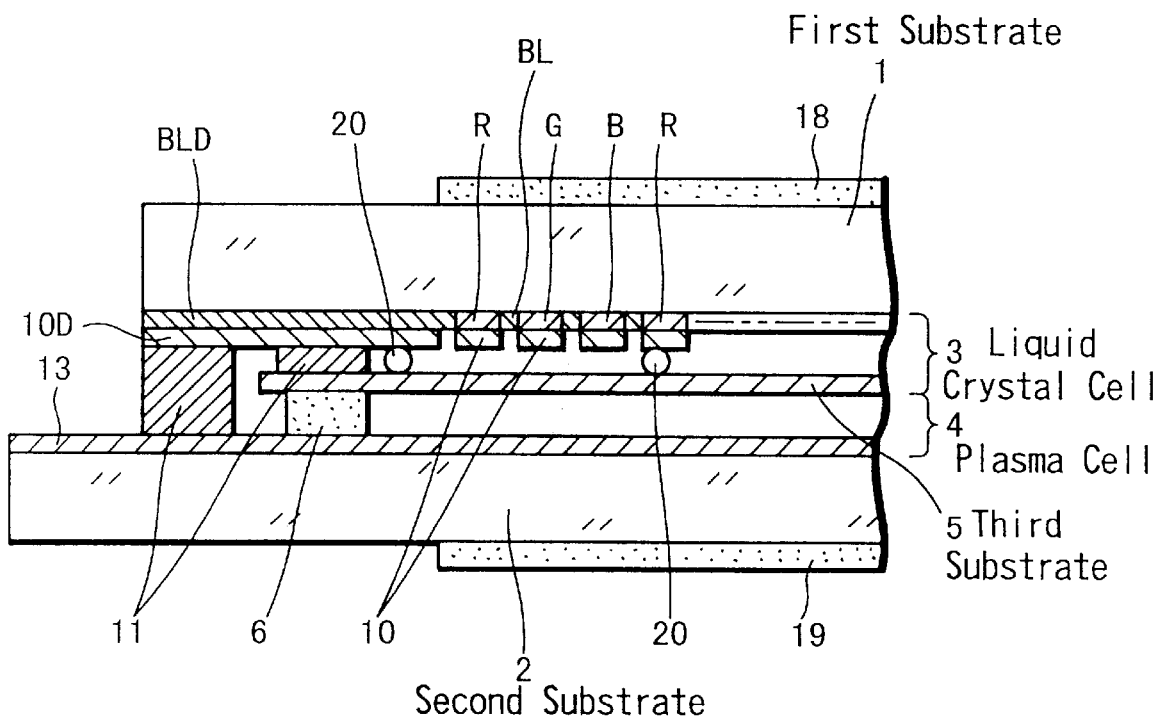
FIG. 3 is a cross-sectional view showing a main portion of the plasma address liquid crystal display device of the present invention in an enlarged scale.

The liquid crystal cell 3 has an effective picture screen area surrounded by a two-dot chain line d in FIG. 1. Further, as shown in FIG. 3 which is a cross-sectional view showing the main portion of the liquid crystal cell 3 in an enlarged scale, in the liquid crystal cell 3, there are sequentially arranged in the effective picture screen area color filters R, G and B of red, green and blue in parallel each of which has a stripe-like shape and extended in a direction to cross the extending direction of the first and second electrodes 8 and 9 in the plasma cell 4, for example, in the vertical direction. A black stripe BL is formed between adjacent ones of the respective color filters R, G and B. A stripe-like shape transparent electrode 10 is formed along each of the color filters R, G and B in the extending direction of the black stripe BL.

The first substrate 1 having formed thereon the respective color filter R, G and B and the transparent electrode 10 is bonded to the third substrate 5 at its outer peripheral portion with a predetermined interval therebetween by an adhesive agent 11 in a liquid-tight, and further bonded to the second substrate 2 outside the first-mentioned bonding portion by an adhesive agent 11. A liquid crystal is charged into the flat liquid-tight space between the first substrate 1 and the third substrate 5, whereby the liquid crystal cell 3 is formed.

Every other transparent electrode 10 of the liquid crystal cell 3, for example, is extended at its both ends to form a terminal T on both projected sides of the first substrate 1 beyond the second substrate 2 in the vertical direction as shown in FIG. 1. The terminals T are set as column terminal groups 12 to which a drive voltage in the horizontal direction is applied.

One electrode, serving as an anode electrode, of the electrodes of the plasma cell 4 is extended at its one end to one side of the second substrate 2 beyond the first substrate 1 in the horizontal direction and is set as row terminal groups 13 to which a drive pulse in the vertical direction is applied.

The respective terminals T of the column terminal groups 12 are connected to the corresponding terminals of a column substrate 14, on which a column drive circuit is formed, through flexible cables 15, respectively.

Similarly, the respective terminals of the row terminal groups 13 are connected to the corresponding terminals of a row substrate 16, on which a row drive circuit is formed, through flexible cables 17, respectively.

On the outer surfaces of the first and second substrates 1 and 2, there are respectively provided film-like polarizing plates 18 and 19 whose polarizing axes cross at a right angle with each other.

In the plasma cell 4 thus arranged, a plasma discharge is sequentially generated in the plasma spaces defined between the adjacent partition walls 7 to thereby make the third substrate 5 serve as an anode electrode. On the other hand, when a predetermined voltage in accordance with a display signal is sequentially applied to the transparent electrodes 10 in the liquid crystal cell 3, a potential difference is generated at that position across the liquid crystal and hence at that position a potential is written in the liquid crystal. Therefore, if such a state is assumed that no potential difference is applied between both the surfaces of the liquid crystal, for example, and almost all the light from a light source disposed on the rear portion of the second substrate 2 can not pass through both the polarizing plates 18 and 19, by the writing of the potential to the liquid crystal mentioned above, the linear polarized light from the polarizing plate 19 is made to pass through the polarizing plate 18, whereby a target optical image can be displayed.

In this case, in order that no display irregularity is generated in the liquid crystal cell of the display device, it is necessary that the thickness of the liquid crystal is uniform at each display portion in the liquid crystal cell. In other words, the interval between the respective transparent electrodes 10 and the third substrate 5 has to be selected uniform. To this end, after the above-mentioned color filters R, G, B and the transparent electrodes 10 are formed, as shown in FIG. 3, particle-like spacers 20, each having a predetermined diameter, are dispersed to uniformly set the interval between the third substrate 5 and the transparent electrode 10 at a predetermined value. In order to set the above-mentioned interval accurately, it is necessary to provide a portion having the height equal to that of the transparent electrode 10 at the peripheral portion of the liquid crystal cell 3. To this end, in this kind of liquid crystal display device, as described above, the transparent electrode 10 is formed not only in the effective picture screen area but also in the ineffective picture screen area around the effective picture screen area at the same time when a dummy light absorbing layer BLD is formed between the adjacent color filters R, G and B by the material same as that of the light absorbing layer BL which has the same thickness as that of the layer BL. On the dummy light absorbing layer BLD, there is formed an ineffective transparent electrode 10D by the same material as that of the transparent electrode 10 with the thickness same as that of the transparent electrode 10 at the same time when the transparent electrode 10 is formed.

Figure 4:
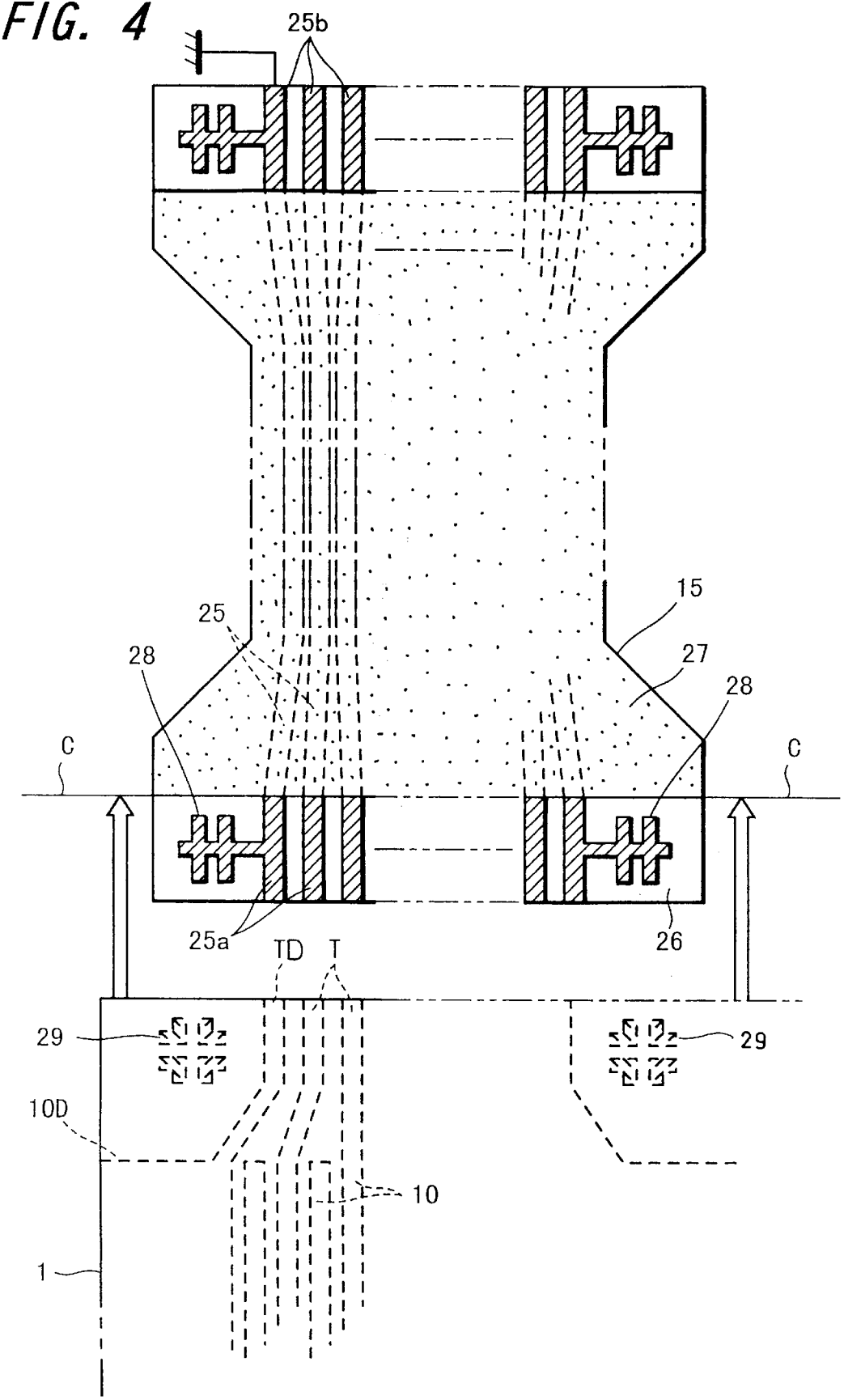
FIG. 4 is a plan view showing the positional relation between a first substrate and a flexible cable corresponding thereto.

FIG. 4 is a plan view showing the positional relation between the substrate 1 and the flexible cable 15 opposing thereto. As shown in FIG. 4, similar to the derived terminal T of the transparent electrode 10 formed in the effective picture screen area, a terminal TD of the ineffective transparent electrode 10D formed in the ineffective picture screen area is extended to be arranged outside the terminal T in parallel thereto.

As shown in FIG. 1, the terminal TD is made a set with a plurality of, for example, 200 terminals T and respective sets are connected to predetermined terminal of a column substrate 14 by a wiring layer 25 of a flexible cable 15.

As shown in FIG. 4, in the flexible cable 15, flexible wiring layers 25 are formed on a flexible insulating sheet 26 in correspondence with predetermined numbers of the terminals T and the terminal TD. Further, an insulating cover 27 is formed thereon to expose both ends 25a and 25b of the wiring layer 25 to the outside.

On the flexible cable 25, the edge portion of the first substrate 1 is made coincident with the position shown by the line c—c in FIG. 4, for example, and the corresponding terminals T and TD of the first substrate 1 are made coincident with the one end 25a of each wiring layer 25. Then, they are electrically and mechanically connected.

The other end 25b of the flexible cable 15 is connected to the corresponding terminal (not shown) of the column substrate 14 described above. In the above arrangement of the present invention, a shown in FIG. 5, the terminal TD, namely the ineffective transparent electrode 10D is applied with a predetermined voltage or grounded through the flexible cable 15. In other words, the ineffective transparent electrode 10D is not floated electrically when the liquid crystal cell 3 is being driven.

In this way, according to the present invention, the ineffective transparent electrode 10D is set to be a predetermined potential state when the liquid crystal cell 3 is being driven but there is no change in view of arrangement as compared with the prior art.

In this kind of display device in the prior art, the terminals T of the transparent electrode 10 formed in the effective picture screen area are overlapped with the end portion 25a of the corresponding wiring layer 25 of the flexible cable 15 and they are connected electrically and mechanically. In this case, since the connection between the wiring layer positioned on both the outermost sides (left and right outsides in the figure) and the transparent electrodes is unstable, a dummy terminal is formed outside the terminal T. On the other hand, in the flexible cable 15 there is also formed a dummy wiring layer 25 and one end 25a thereof is connected to the dummy terminal. In this case, however, the wiring layer 25 corresponding to the dummy terminal is not electrically connected to another part. In other words, the dummy terminal is floated electrically and is only employed to make the mechanical connection stable.

In the present invention, the dummy terminal is formed to be extended from the ineffective transparent electrode 10D in the ineffective picture screen area and is used as the terminal TD of the ineffective transparent electrode 10D. Also, the dummy wiring layer 25 of the flexible cable 15 is used as a wiring layer for applying a voltage to the terminal TD of the ineffective transparent electrode 10D or grounding the same.

When a voltage is applied to the ineffective transparent electrode 10D from one outside, it is desired that the voltage is to be a voltage which is as possible as same that applied to the effective transparent electrode 10. However, when the above voltages are applied from the same power source, because the areas of both the electrodes 10D and 10 are different considerably and they are different much in distribution capacity, the voltages are desired to be applied independently.

Figure 5:
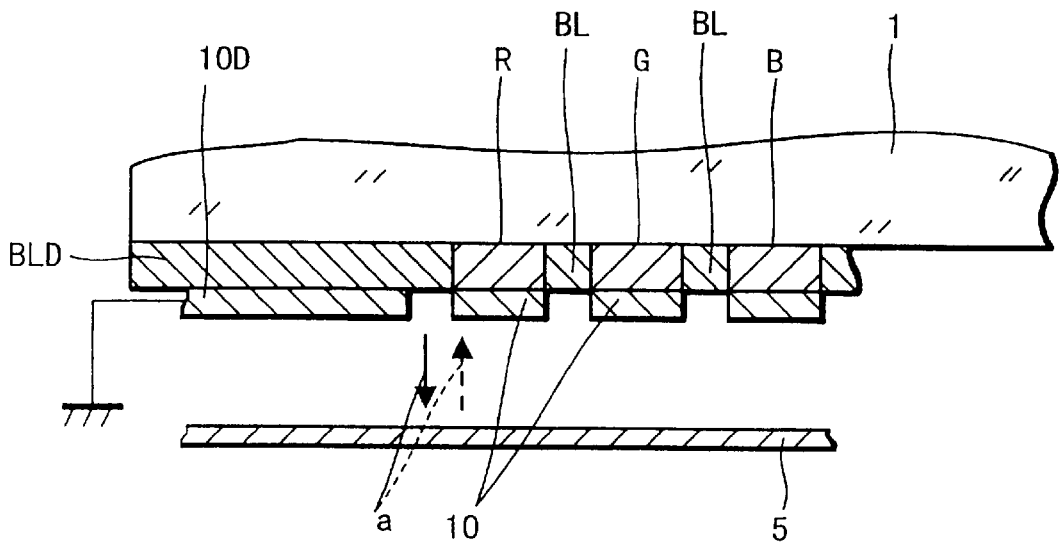
FIG. 5 is an diagram used to explain the operation of the plasm address liquid crystal display device to which the present invention is applied.
Figure 6:
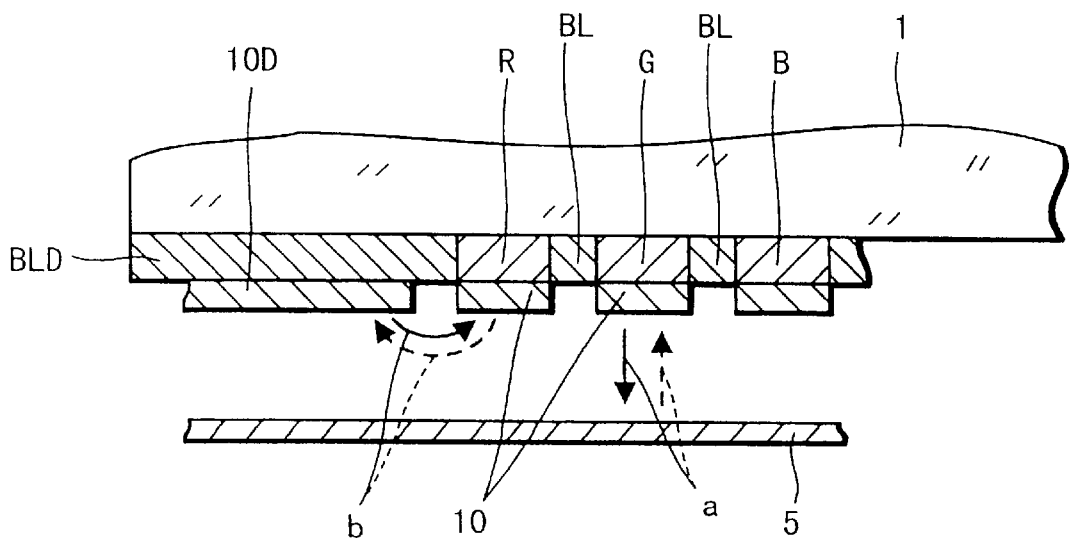
FIG. 6 is a diagram used to explain the operation of a conventional plasma address liquid crystal display device.

Incidentally, for the position matching between the flexible cable 15 and the first substrate 1, as shown in FIG. 4, at the same time when the wiring layer 15 is formed, a mark 28 of a shape such as a dragonfly shown in FIG. 5, a cross or the like is formed. Meanwhile, a mark 29 having the inverted shape of the mark 28 is formed on the first substrate 1 together with the transparent electrodes 10, 10D and the terminals T, TD thereof.

Then, when the marks 28 and 29 are made coincident complementally, the mutual position matching is carried out, namely the respective wiring layer 25 and the terminals T, TD can be matched in position.

As set forth above, in the present invention, the ineffective transparent electrode lOD formed in the ineffective picture screen area of the liquid crystal cell 3 is grounded or is applied with a drive voltage nearly same as that applied to the effective transparent electrode 10 formed in the effective picture screen area adjacent to the ineffective transparent electrode 10D. Therefore, it is possible to avoid such a phenomenon that an unstable electric field is generated between the ineffective transparent electrode 10D and the effective transparent electrode 10 adjacent thereto or the generation of electric field therebetween can be avoided substantially. Thus, it is possible to effectively avoid the distortion or unstableness of display picture screen by the disturbance of liquid crystal near the outside of the effective picture screen.

By the way, while the present invention is applied to a color display device of plasma address liquid crystal display type in the above embodiment, it is needless to say that the present invention can be applied to a monochromatic display device or various changes and modifications can be effected without departing the gist of the present invention.

As described above, according to the present invention since the generation of undesired electric field between the ineffective transparent electrode formed in the ineffective picture screen area and the effective transparent electrode formed in the effective picture screen area adjacent thereto in the liquid crystal cell is avoided, it is possible to obtain a display image of high quality on the whole range of the effective picture screen area.

Although such an effect is attained, no special change is required in the arrangement of the prior art.

Thus, according to the present invention it is possible to avoid considerable change of the manufacturing process of the display device and considerable increase of the number of manufacturing process, so that a plasma address liquid crystal display device of high quality can be formed without increasing its cost.

Having described preferred embodiments of the present invention with reference to the accompanying drawings, it is to be understood that the present invention is not limited to the abovementioned embodiments and that various changes and modifications can be effected therein by one skilled in the art without departing from the spirit or scope of the present invention as defined in the appended claims.

What is claimed is:

1. A plasma address liquid crystal display device comprising:

a first substrate;

a second substrate;

a third substrate disposed between said first and second substrates;

a liquid crystal cell formed by charging a liquid crystal into a space between said first and third substrates; and a plasma cell formed by sealing a discharge gas into a space between said second and third substrates, wherein an ineffective transparent electrode formed in an ineffective picture screen area of said liquid crystal cell is grounded or applied with a drive voltage substantially same as that applied to a liquid crystal electrode formed in an effective picture screen area adjacent to said ineffective transparent electrode.

2. A plasma address liquid crystal display device as claimed in claim 1, wherein a dummy conductive layer is formed on a flexible cable which is used to electrically connect the liquid crystal electrode formed in the effective picture screen area of the liquid crystal cell to an outside, a terminal portion of the ineffective transparent electrode formed in the ineffective picture screen area of said liquid crystal cell is connected to said dummy conductive layer, and through said dummy conductive layer said ineffective transparent electrode is grounded or is applied with said drive voltage.

* * * * *